(12) United States Patent  
Spatafora

(10) Patent No.: US 6,215,117 B1  
(45) Date of Patent: Apr. 10, 2001

(54) OPTICAL PRESENCE DETECTING DEVICE

(75) Inventor: Mario Spatafora, Bologna (IT)

(73) Assignee: G.D Societa Per Azioni, Bologna (IT)

( * ) Notice: Subject to any disclaimer, the term of this patent is extended or adjusted under 35 U.S.C. 154(b) by 0 days.

(21) Appl. No.: 09/247,759

(22) Filed: Feb. 9, 1999

(30) Foreign Application Priority Data

Feb. 12, 1998 (IT) ............................. BO98A0072

(51) Int. Cl.[7] .......................... B65B 19/30; B65B 57/10
(52) U.S. Cl. .................................. 250/222.1; 250/223 R
(58) Field of Search .................. 250/214 R, 559.29, 250/559.4, 222.1, 223 R; 385/116–118

(56) References Cited

U.S. PATENT DOCUMENTS

| | | | |
|---|---|---|---|
| 5,299,275 | 3/1994 | Jackson et al. | 385/116 |
| 5,550,380 | * 8/1996 | Sugawara et al. | 250/370.11 |
| 5,875,025 | * 2/1999 | Sugawara et al. | 356/71 |

FOREIGN PATENT DOCUMENTS

| | | |
|---|---|---|
| 4000658 | 8/1990 | (DE) . |
| 4424045 | 1/1996 | (DE) . |
| 0330495 | 8/1989 | (EP) . |
| 0518141 | 12/1992 | (EP) . |
| 2631786 | 12/1989 | (FR) . |
| 2115144 | 9/1983 | (GB) . |
| 2272762 | 5/1994 | (GB) . |

OTHER PUBLICATIONS

Abstract of DE 4000658 dated Aug. 9, 1990.

Abstract of DE 4424045 dated Jan. 18, 1996.

Abstract of FR 2631786 dated Dec. 1, 1989.

* cited by examiner

*Primary Examiner*—F L. Evans  
(74) *Attorney, Agent, or Firm*—Ladas & Parry

(57) ABSTRACT

An optical device for detecting the presence of an object at a control station located along a path of the object; the device employs an optical fiber having two ends, a CCD sensor, and an electronic control unit connected to the CCD sensor; a first end of the optical fiber is so located at the control station as to face the path of the object, and a second end is connected directly to a photosensitive surface of the CCD sensor.

5 Claims, 2 Drawing Sheets

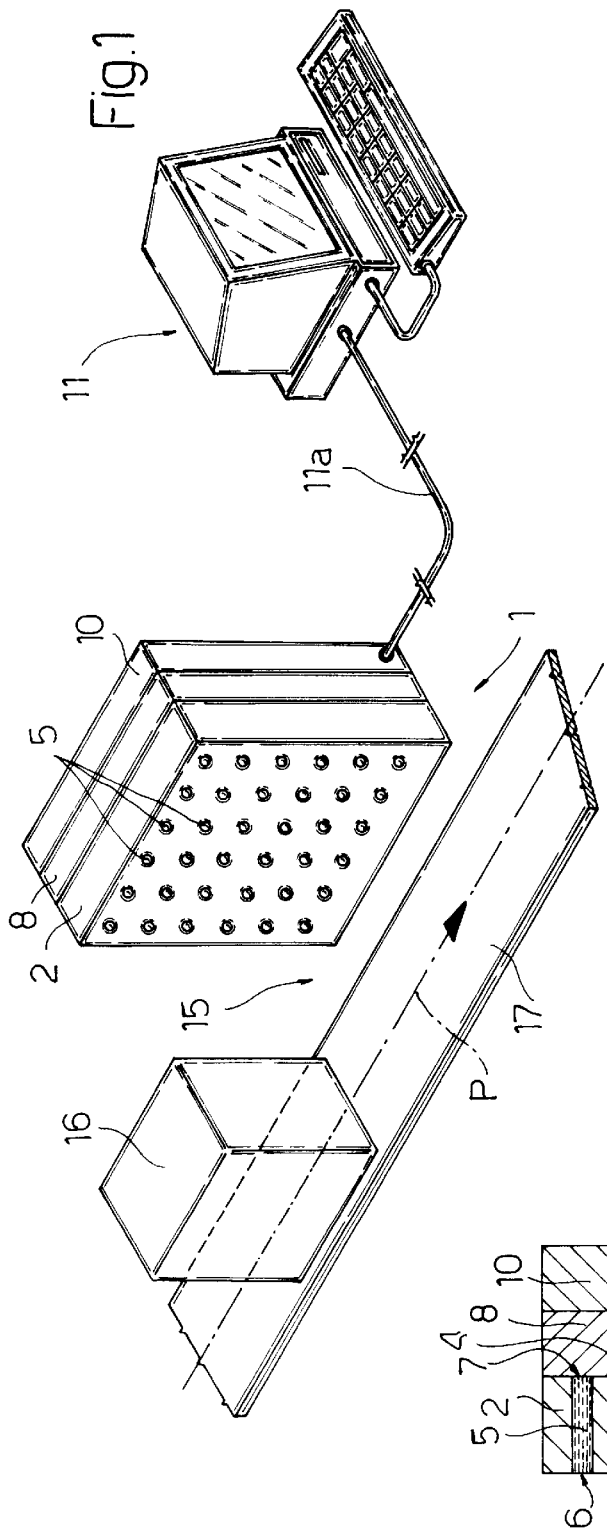
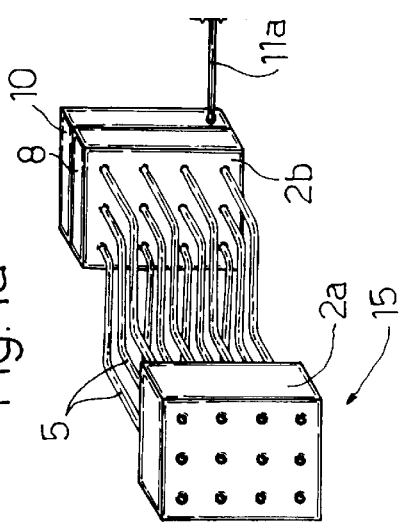
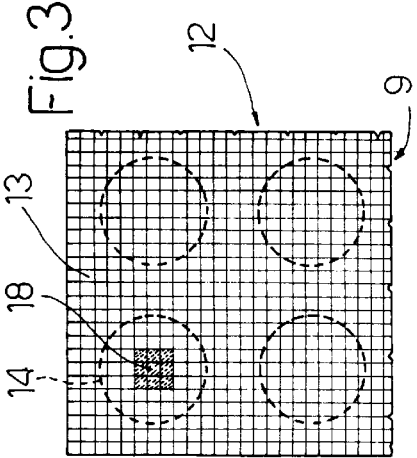
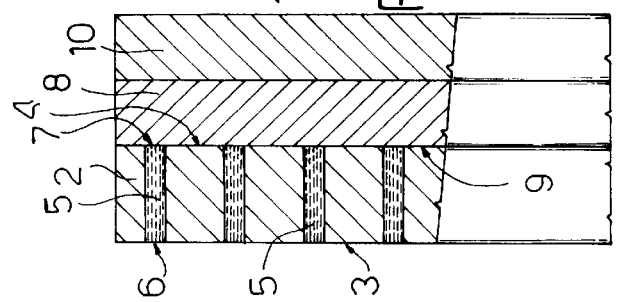

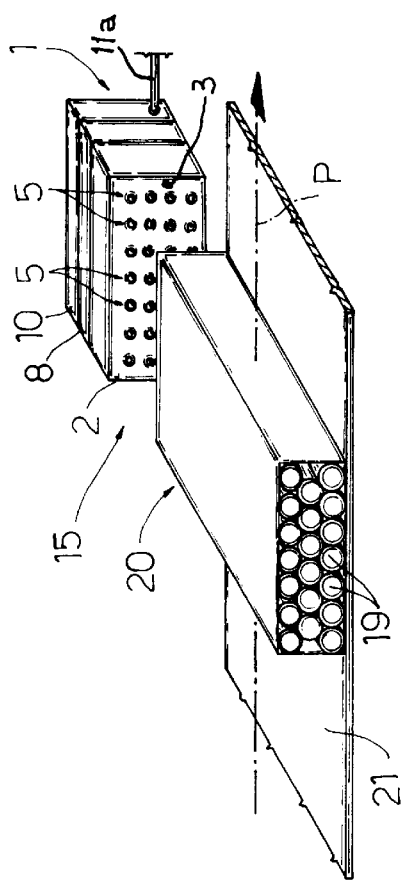
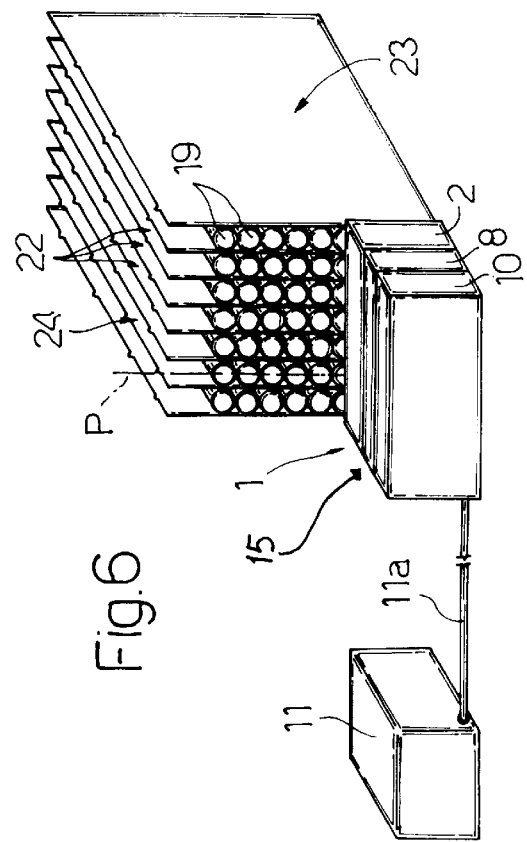
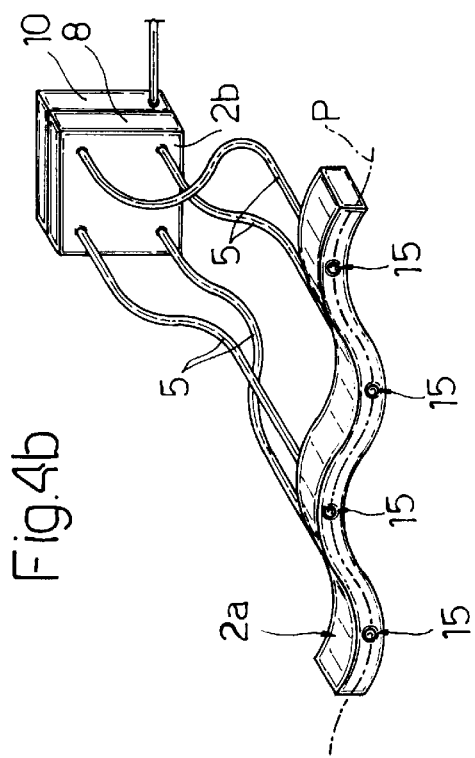

OPTICAL PRESENCE DETECTING DEVICE

The present invention relates to an optical presence detecting device.

The present invention may be used to advantage for detecting the presence of an object at a control station located along a path of the object itself, and in particular for detecting the presence of cigarettes at a control station located along a path of single or groups of cigarettes, in particular through a cigarette packing machine.

BACKGROUND OF THE INVENTION

On cigarette packing machines, a group of cigarettes is first formed, normally comprising three superimposed layers of 7-6-7 cigarettes respectively, and which is fed to a succession of packing wheels. Before performing any of the packing operations, however, it is common practice to perform on each group of cigarettes a series of checks, including detecting the presence of all the cigarettes in the group.

This is known to be done using a device of the type described in U.S. Pat. No. 5,235,649 (or in the corresponding EP Patent No. 518,141), which employs an optical-fiber bundle, wherein a first end of each optical fiber is so positioned as to face, at a control station, the tip of a respective cigarette in the group for examination, and a second end of each optical fiber is connected optically to the lens of a CCD television in turn connected to a digitizing board of a monitoring computer.

In actual use, each group of cigarettes is fed into the control station, where the camera picks up an image of the tips on one side of the group; the digitizing board connected to the camera digitizes the image; and the computer acquires the digitized image from the digitizing board in the form of a matrix of brightness values, and processes the image to determine the presence or absence, and possible also the fill density, of each cigarette.

Devices of the above type are fairly expensive, by requiring a television camera with a respective optical assembly, a digitizing board, and a monitoring computer, and are even more expensive when high-speed operation is called for, as in the case of modern cigarette packing machines capable of producing as many as ten packets of cigarettes a second. Consequently, known devices of the above type are normally only justified when used to determine both the presence and the tip fill density of the cigarettes, and are redundant when used for presence detection only, by acquiring and processing a "complex" image, i.e. containing information which is of no use for presence detection purposes only.

U.S. Pat. No. 5,299,275 discloses a device comprising a boundle of optical fibers, which is used as a blur filter to limit high spatial frequencies incident upon an image sensor. Each optical fiber has a first end coupled to a lens and a second end coupled directly to a photosensitive surface of a CCD sensor. In the above known device, in order to obtain a blur filtering effect, the second end of each optical fiber is maintained separated by a given distance from the photosensitive surface of the CCD sensor.

SUMMARY OF THE INVENTION

It is an object of the present invention to provide an optical presence detecting device designed to eliminate the aforementioned drawbacks, and which in particular is straightforward and cheap to produce.

According to the present invention, there is provided a device for optically detecting the presence of at least one object, in particular a cigarette, the device comprising at least one optical fiber having a first end so located as to face, in use, said object, and a second end; a supporting body for supporting said optical fiber, the supporting body having a first and a second surface, and said second surface being a flat surface; a CCD sensor having a photosensitive surface; and an electronic control unit connected to the CCD sensor; the device being characterized in that said second end of the optical fiber is connected directly to said photosensitive surface of the CCD sensor; a portion of said second surface being defined by said second end of the optical fiber, and said second flat surface being parallel to, and in direct contact with, said photosensitive surface.

BRIEF DESCRIPTION OF THE DRAWINGS

A non-limiting embodiment of the present invention will be described by way of example with reference to the accompanying drawings, in which:

FIG. 1 shows a schematic view in perspective of a preferred embodiment of the device according to the invention;

FIG. 2 shows a schematic, partially sectioned side view of FIG. 1;

FIG. 3 shows a schematic, larger-scale front view of a detail of the FIG. 1 device;

FIGS. 4a and 4b show views in perspective, with parts removed for clarity, of two variations of the FIG. 1 device;

FIG. 5 shows a view in perspective of one example application of the FIG. 1 device;

FIG. 6 shows a view in perspective of a further example application of the FIG. 1 device.

DETAILED DESCRIPTION OF THE INVENTION

Number 1 in FIGS. 1 and 2 indicates as a whole an optical presence detecting device comprising a substantially parallelepiped supporting body 2 having two parallel flat surfaces 3 and 4; a number of optical fibers 5 carried by supporting body 2 and each having an end 6 and an end 7; a CCD sensor 8 connected to supporting body 2 and having a flat photosensitive surface 9; and an electronic control unit 10 connected to CCD sensor 8 and communicating with an external monitoring unit 11—normally a computer—over a cable 11a.

As shown more clearly in FIG. 2, ends 6 and 7 of optical fibers 5 are substantially flat and respectively define a portion of surface 3 and a portion of surface 4 of supporting body 2; and surface 4 of supporting body 2 is parallel to, and in direct contact with, photosensitive surface 9 of CCD sensor 8, so that end 7 of each optical fiber 5 is connected directly to CCD sensor 8.

As shown in FIG. 3, photosensitive surface 9 of CCD sensor 8 comprises a grid 12 of pixels 13, and the end 7 of each optical fiber 5 directly contacts a respective group 14 of pixels 13.

Operation of device 1 will be described, for the sake of simplicity, with reference to one optical fiber 5 for optically detecting the presence, at a control station 15, of an object 16 guided by a conveying device 17 along a path P extending through station 15.

At control station 15, end 6 of optical fiber 5 is so located as to face object 16 traveling through station 15.

In actual use, optical fiber 5 transmits to end 7, and therefore directly to pixels 13 in respective group 14, the light impinging on end 6; and control unit 10 reads the brightness value picked up by pixels 13 in group 14, and determines, on the basis of said brightness value, whether end 6 of optical fiber 5 is or is not facing an object 16. More specifically, if not facing an object 16, end 6 receives a fairly large amount of light, so that the brightness value picked up by respective pixels 13 is above a first threshold value. Conversely, if facing, and hence shielded by, an object 16, end 6 receives a fairly small amount of light, so that the brightness value picked up by respective pixels 13 is below a second threshold value.

In an alternative embodiment, control unit 10 may use one threshold to determine the presence or absence of an object 16 opposite end 6 of optical fiber 5.

In yet a further embodiment, unit 10 may read the brightness picked up by only a portion 18 of pixels 13 in group 14—typically the central portion, as shown in FIG. 3. Not reading the outer pixels 13 provides for eliminating any errors caused by incorrect positioning of optical fibers 5 with respect to photosensitive surface 9, in which case, the outer pixels 13 may not be connected correctly to end 7 of optical fiber 5.

As shown in FIGS. 1 and 4a, device 1 may comprise a number of optical fibers 5 with respective ends 6 arranged at control station 15 in a given geometrical configuration. This embodiment provides for simultaneously detecting the presence of a number of objects 16 traveling in a group arranged in said geometrical configuration, by each object 16 being positioned, in use, facing end 6 of a respective optical fiber 5.

In a further embodiment shown in FIG. 4b, detecting device 1 comprises a number of successive control stations 15 located along the path P of object 16 (or group of objects 16); and the end 6 of an optical fiber 5 is so located at each control station 15 as to face the object 16 traveling through control station 15. This embodiment is normally used to determine the travel of object 16 along path P.

In further embodiments shown in FIGS. 4a and 4b, supporting body 2 may be divided into a body 2a having surface 3 defined partially by ends 6 of optical fibers 5, and a body 2b separate from body 2a and having surface 4 defined partially by ends 7 of optical fibers 5 and connected to photosensitive surface 9 of CCD sensor 8. The distance between bodies 2a and 2b is limited solely by the light transmitting capacity of optical fibers 5. In yet a further embodiment (not shown), ends 6 of optical fibers 5 are carried by a number of respective independent bodies 2a.

In yet a further embodiment (not shown), each optical fiber 5 comprises a bundle of elementary optical fibers.

As stated, device 1 as described may be used to advantage in the cigarette packing industry, and in particular for detecting the presence of cigarettes 19.

FIG. 5 shows a number of cigarettes 19 arranged, in known manner not shown, in an orderly group 20, which is fed along path P by a known conveyor 21 extending through station 15, where supporting body 2 is positioned with surface 3 parallel to path P; and surface 3 is defined partially by ends 6 of a group of optical fibers 5 arranged in the same geometrical configuration as cigarettes 19 in group 20.

As a group 20 traveling along path P reaches control station 15, monitoring unit 11, via cable 11a, interrogates unit 10, which, after determining the brightness threshold of each group 14 of pixels 13, supplies monitoring unit 11 with a response indicating the presence or absence of each cigarette 19 associated with a respective optical fiber 5.

As shown in FIG. 6, besides detecting groups 20 of cigarettes 19, detecting device 1 may also be used to advantage for detecting the presence of cigarettes 19 inside the channels 22 of a cigarette hopper 23.

FIG. 6 shows a mass 24 of cigarettes 19, which are fed by gravity along a path P defined by channels 22, and along which is located a control station 15 of a detecting device 1 of the type described above.

Via cable 11a, monitoring unit 11 provides for cyclically interrogating unit 10, which, after determining the brightness threshold of each group 14 of pixels 13, supplies unit 11 with a response indicating the presence or absence of each cigarette 19 associated with a respective optical fiber 5.

Cable 11a between units 10 and 11 is preferably a serial cable operating according to a standard IBM 2848 protocol.

What is claimed is:

1. A device for optically detecting the presence of at least one object guided by a conveying device (17) along a path (P) extending through a control station (15), the device comprising at least one optical fiber (5) having a first (6) end located in said control station (15) so as to face, in use, said object (16), and a second (7) end; a supporting body (2) for supporting said optical fiber (5), the supporting body (2) having a first and a second surface (3, 4), and said second surface (4) being a flat surface; a CCD sensor (8) having a photosensitive surface (9); and an electronic control unit (10) connected to the CCD sensor (8); wherein said second end (7) of the optical fiber (5) is connected directly to said photosensitive surface (9) of the CCD sensor (8); a portion of said second surface (4) being defined by said second end (7) of the optical fiber (5), and said second flat surface (4) being parallel to, and in direct contact with, said photosensitive surface (9); said photosensitive surface (9) comprising a grid of pixels (23) said second end (7) being in direct contact with a group (14) of pixels, said control unit (10) determining brightness of the pixels (13) of said group (14) and comparing a value of said brightness with a threshold value.

2. A device as claimed in claim 1, wherein said first surface (3) is a flat surface having a portion defined by said first end (6) of the optical fiber (5).

3. A device as claimed in claim 2, wherein said supporting body (2) comprises a first body (2a) having said first surface (3) and a second body (2b) separated from said first body (2a) and having said second surface (4).

4. A device as claimed in claim 1, comprising two said optical fibers (5), guide means (17) for guiding said object (16) along said path (P), and at least two said control stations (15) located along said path (P); each said control station (15) being associated with a first end (6) of a respective one of said two optical fibers (5).

5. A device for optically detecting the presence of a plurality of cigarettes (19) fed along a conveyor (21, 23) extending through a control station (15), the device comprising a plurality of optical fibers (5) enclosed in a supporting body (2); each optical fiber (5) having a first end (6) located in said control station (15) so as to face, in use, said cigarettes (19), and a second (7) end; said optical fibers (5), being enclosed in said supporting body in a spaced apart arrangement from one another in a given pattern corresponding to an arrangement of the cigarettes along said conveyor (21, 23), the supporting body (2) having a first and a second surface (3, 4), and said second surface (4) being a flat surface; a CCD sensor (8) having a photosensitive surface (9); and an electronic control unit (10) connected to the CCD sensor (8); wherein said second ends (7) of the optical fibers (5) are connected directly to said photosensitive surface (9) of the CCD sensor (8); a portion of said second surface (4) being defined by said second ends (7) of the optical fibers (5), and said second flat surface (4) being parallel to, and in direct contact with, said photosensitive surface (9); said photosensitive surface (9) comprising a grid of pixels (13) said second ends (7) being in direct contact with a group (14) of said pixels, said control unit (10) determining a value of brightness of the pixels (13) of said group (14) and comparing said value of brightness with a threshold value.

\* \* \* \* \*